US011511268B2

(12) United States Patent
Ueda et al.

(10) Patent No.: US 11,511,268 B2
(45) Date of Patent: Nov. 29, 2022

(54) PILLAR-SHAPED HONEYCOMB STRUCTURE AND METHOD FOR MANUFACTURING SAME

(71) Applicant: NGK INSULATORS, LTD., Nagoya (JP)

(72) Inventors: Shuji Ueda, Nagoya (JP); Shungo Nagai, Nagoya (JP); Hiroaki Hayashi, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 17/177,377

(22) Filed: Feb. 17, 2021

(65) Prior Publication Data

US 2021/0299646 A1  Sep. 30, 2021

(30) Foreign Application Priority Data

Mar. 31, 2020  (JP) .............................. JP2020-064972

(51) Int. Cl.
*B01J 35/04* (2006.01)
*C04B 38/00* (2006.01)
(Continued)

(52) U.S. Cl.
CPC .......... *B01J 35/04* (2013.01); *B01D 39/2079* (2013.01); *B01D 46/244* (2013.01);
(Continued)

(58) Field of Classification Search
None
See application file for complete search history.

(56) References Cited

U.S. PATENT DOCUMENTS

2006/0112669 A1*  6/2006  Yamada ................ B28B 11/006
                                                   439/78
2006/0216465 A1*  9/2006  Kai ..................... C04B 38/0012
                                                  428/116
(Continued)

FOREIGN PATENT DOCUMENTS

EP        2 484 504 A1     8/2012
JP     2010-247145 A      11/2010
(Continued)

OTHER PUBLICATIONS

Japanese Office Action (with English translation), Japanese Application No. 2020-064972, dated Aug. 23, 2022 (8 pages).

*Primary Examiner* — Elizabeth Collister
(74) *Attorney, Agent, or Firm* — Burr & Brown, PLLC

(57) ABSTRACT

A pillar-shaped honeycomb structure including an outer peripheral side wall, a plurality of first cells provided on an inner peripheral side of the outer peripheral side wall, the first cells extending from a first end surface to a second end surface, each opening on the first end surface and having a sealing portion with an average void ratio of 4% or less on the second end surface, and a plurality of second cells provided on the inner peripheral side of the outer peripheral side wall, the second cells extending from the first end surface to the second end surface, each having a sealing portion with an average void ratio of 4% or less on the first end surface and opening on the second end surface, the first cells and the second cells being alternately arranged adjacent to each other with a partition wall interposed therebetween.

7 Claims, 2 Drawing Sheets

(51) Int. Cl.
  *B01D 46/24*   (2006.01)
  *B01J 37/00*   (2006.01)
  *B01D 39/20*   (2006.01)
  *B01D 53/88*   (2006.01)

(52) U.S. Cl.
  CPC ..... *B01D 46/2425* (2013.01); *B01D 46/2476* (2021.08); *B01D 46/24491* (2021.08); *B01D 53/885* (2013.01); *B01J 37/0009* (2013.01); *C04B 38/0009* (2013.01); *B01D 2255/92* (2013.01)

(56) References Cited

U.S. PATENT DOCUMENTS

| | | | | |
|---|---|---|---|---|
| 2008/0307760 | A1* | 12/2008 | Chatlani | C04B 35/195 501/39 |
| 2009/0205303 | A1* | 8/2009 | Ichikawa | B01D 46/2474 428/117 |
| 2010/0058725 | A1* | 3/2010 | Konomi | B01D 46/244 427/193 |
| 2011/0070396 | A1* | 3/2011 | Kimura | C04B 35/195 428/116 |
| 2013/0247525 | A1* | 9/2013 | Tsuchiya | B01D 46/244 55/484 |
| 2017/0234181 | A1* | 8/2017 | Shibayama | B01D 46/2429 428/117 |
| 2018/0222083 | A1* | 8/2018 | Nagai | C04B 35/565 |

FOREIGN PATENT DOCUMENTS

| | | |
|---|---|---|
| JP | 2018-126869 A1 | 8/2018 |
| WO | 2011/040145 A1 | 4/2011 |

* cited by examiner

PILLAR-SHAPED HONEYCOMB STRUCTURE AND METHOD FOR MANUFACTURING SAME

FIELD OF THE INVENTION

The present invention relates to a pillar-shaped honeycomb structure and a method for manufacturing the same.

BACKGROUND OF THE INVENTION

An exhaust gas emitted from an internal combustion engine such as diesel engines contains a large amount of carbon-based particulates (particulate matters) that causes environmental pollution. Therefore, in general, an exhaust system of a diesel engine or the like is equipped with a filter (Diesel Particulate Filter: DPF) for collecting the particulates. In recent years, particulates emitted from gasoline engines have also become a problem, and gasoline engines have also been equipped with a filter (Gasoline Particulate Filter: GPF).

As a filter, there has been known a wall flow type pillar-shaped honeycomb structure comprising an outer peripheral side wall, a plurality of first cells extending from a first end surface to a second end surface, opening on the first end surface and having a sealing portion on the second end surface, and a plurality of second cells extending from the first end surface to the second end surface, having a sealing portion on the first end surface and opening on the second end surface, the first cells and the second cells being alternately arranged adjacent to each other with a partition wall interposed therebetween.

When a pillar-shaped honeycomb structure with the sealing portions is used as a filter, the pillar-shaped honeycomb structure is normally accommodated in a metal case via a cushioning material (canning). In this accommodating process (canning process), strong pressure (stress) may be applied to the outer peripheral side wall of the pillar-shaped honeycomb structure. As a result, shear stress is generated at the interface between the sealing portions and the partition walls. At this time, the shear stress gradually increases from the central portion toward the outer peripheral side wall of the sealed honeycomb structure, and when the stress exceeds the shear strength of the partition walls, cracks occur from the outer circumference toward the inside at the interface between the sealing portions and the partition walls, and defects such as peeling of the sealing portions occur in the vicinity of the outer peripheral side wall of the pillar-shaped honeycomb structure. Accordingly, in order to prevent defects such as peeling of the sealing portions during canning, a method of increasing the porosity of the sealing portions is known (Patent Literature 1: Japanese Patent Application Publication 2018-126869).

Further, in a filter provided with a pillar-shaped honeycomb structure the having sealing portions, the sealing portions play a role of preventing the captured particulate matter from leaking out (erosion) from the filter. Therefore, it is important for ensuring the filter performance that the sealing portions are formed at predetermined positions and at a predetermined depth. Conventionally, some of the sealing portions have a recessed outer end face, have large air bubbles irregularly inside the sealing portions, or have non-uniform sealing depth of the sealing portions. Accordingly, when the temperature of the filter is raised and lowered, the thermal stress may be concentrated on partial locations of the filter, and the honeycomb filter may be damaged.

Therefore, in Patent Literature 2 (WO 2011/040145), there has been proposed a pillar-shaped honeycomb structure, wherein the outer end face of the sealing portions is flat, and the sealing portions do not have air bubbles of 0.3 mm or more in diameter, and furthermore, a value obtained by dividing the standard deviation of the sealing depth of the sealing portions by the average sealing depth of the sealing portions is 0.15 or less. According to this literature, due to these characteristics, variations in heat capacity, thermal expansion (rate), Young's modulus and the like of the sealing portions can be extremely reduced, and when a temperature change or the like occurs, occurrence of partial locations where stress is concentrated can be suppressed. Therefore, occurrence of cracking, deformation or the like of the honeycomb structure when a temperature change or the like occurs can be suppressed.

CITATION LIST

Patent Literature

[Patent Literature 1] Japanese Patent Application Publication 2018-126869
[Patent Literature 2] WO 2011/040145

SUMMARY OF THE INVENTION

Patent Literature 1 proposes to increase the porosity of the sealing portions in order to prevent defects such as peeling of the sealing portions during canning. Patent Literature 1 also proposes a solution for preventing the generation of coarse agglomerates, which is a side effect of increasing the porosity of the sealing portions. However, erosion in which the particulate matters leak from the sealing portions has not been sufficiently studied.

In Patent Literature 2, although it is mentioned as an issue to suppress the occurrence of cracking, deformation or the like of the honeycomb structure when a temperature change or the like occurs, the problem of erosion has not been sufficiently discussed. In addition, there are not sufficient considerations regarding defects such as peeling of the sealing portions during canning.

The present invention has been created in view of the above circumstances, and in one embodiment, an object of the present invention is to provide a pillar-shaped honeycomb structure which can contribute to the suppression of defects such as peeling of the sealing portions during canning and which is also effective in preventing erosion. Further, in another embodiment, an object of the present invention is to provide a method for manufacturing such a pillar-shaped honeycomb structure.

As a result of diligent studies to solve the above problems, the present inventors have found that, in order to solve the above problems, it is important to control the void ratio that defines the internal structure of the sealing portions, which is more macroscopic than the porosity. The present invention has been completed based on the above findings, and is exemplified as below.

[1]
A pillar-shaped honeycomb structure comprising an outer peripheral side wall, a plurality of first cells provided on an inner peripheral side of the outer peripheral side wall, the first cells extending from a first end surface to a second end surface, each opening on the first end surface and having a sealing portion with an average void ratio of 4% or less on the second end surface, and a plurality of second cells provided on the inner peripheral side of the outer peripheral side wall, the second cells extending from the first end surface to the second end surface, each having a sealing portion with an average void ratio of 4% or less on the first end surface and opening on the second end surface, the first cells and the second cells being alternately arranged adjacent to each other with a partition wall interposed therebetween.

[2]

The pillar-shaped honeycomb structure according to [1], wherein an average porosity of the sealing portions is 65% to 75% on both the first end surface and the second end surface.

[3]

A method for manufacturing a pillar-shaped honeycomb structure comprising an outer peripheral side wall, a plurality of first cells provided on an inner peripheral side of the outer peripheral side wall, the first cells extending from a first end surface to a second end surface, each opening on the first end surface and having a sealing portion on the second end surface, and a plurality of second cells provided on the inner peripheral side of the outer peripheral side wall, the second cells extending from the first end surface to the second end surface, each having a sealing portion on the first end surface and opening on the second end surface, the first cells and the second cells being alternately arranged adjacent to each other with a partition wall interposed therebetween, the method comprising filling an opening portion of the first cells and the second cells where a sealing portion is to be formed with a slurry, and then drying and firing the filled slurry to form each of the sealing portions,
wherein the slurry for forming the sealing portions comprises 0.1 to 0.5 parts by mass of a thickener, 0.2 to 1.0 parts by mass of a binder, 7 to 15 parts by mass of a pore-former, and 30 to 50 parts by mass of water, with respect to 100 parts by mass of a ceramic raw material.

[4]

The method for manufacturing a pillar-shaped honeycomb structure according to [3], wherein the slurry for forming the sealing portions comprises 0.2 to 0.4 parts by mass of the thickener, 0.2 to 0.5 parts by mass of the binder, 7 to 15 parts by mass of the pore-former, and 35 to 40 parts by mass of the water, with respect to 100 parts by mass of the ceramic raw material.

[5]

The method for manufacturing a pillar-shaped honeycomb structure according to [3] or [4], wherein a viscosity of the slurry for forming the sealing portions measured at a shear rate of 1.04 sec$^{-1}$ at 25° C. by a viscosity measuring method in accordance with JIS R1652: 2003 using a Brookfield type single rotational B type viscometer is 250 to 350 dPa·s.

[6]

The method for manufacturing a pillar-shaped honeycomb structure according to any one of [3] to [5], wherein the pore-former is a foamed resin.

[6]

The method for manufacturing a pillar-shaped honeycomb structure according to any one of [3] to [6], wherein the pore-former is a powder having a D80 of more than 55 μm and a D90 of more than 70 μm in a volume-based cumulative particle size distribution obtained by a laser diffraction/scattering method.

According to one embodiment of the present invention, a pillar-shaped honeycomb structure which can contribute to the suppression of defects such as peeling of the sealing portions during canning and which is also effective in preventing erosion can be provided.

DETAILED DESCRIPTION OF THE INVENTION

Hereinafter, embodiments of the present invention will be described in detail with reference to the drawings. It should be understood that the present invention is not limited to the following embodiments, and any change, improvement or the like of the design may be appropriately added based on ordinary knowledge of those skilled in the art without departing from the spirit of the present invention.

(1. Pillar-Shaped Honeycomb Structure)

Figure 1:
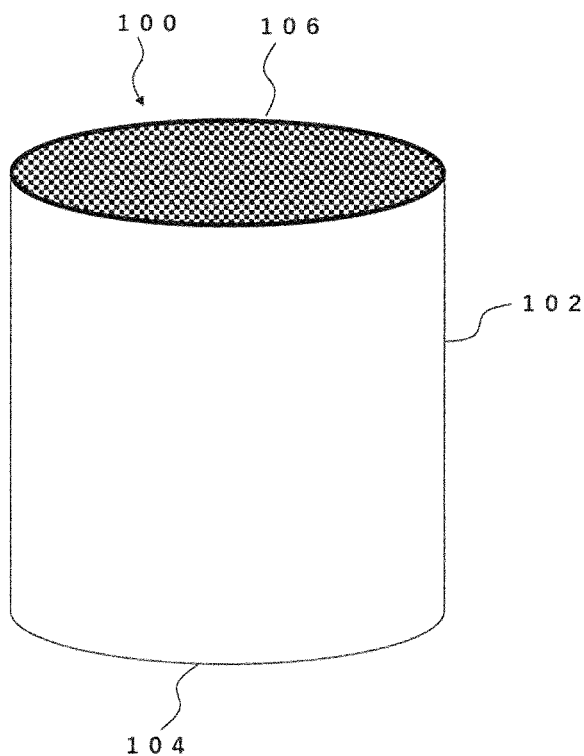
FIG. 1 is a perspective view schematically showing a wall flow type pillar-shaped honeycomb structure.
Figure 2:
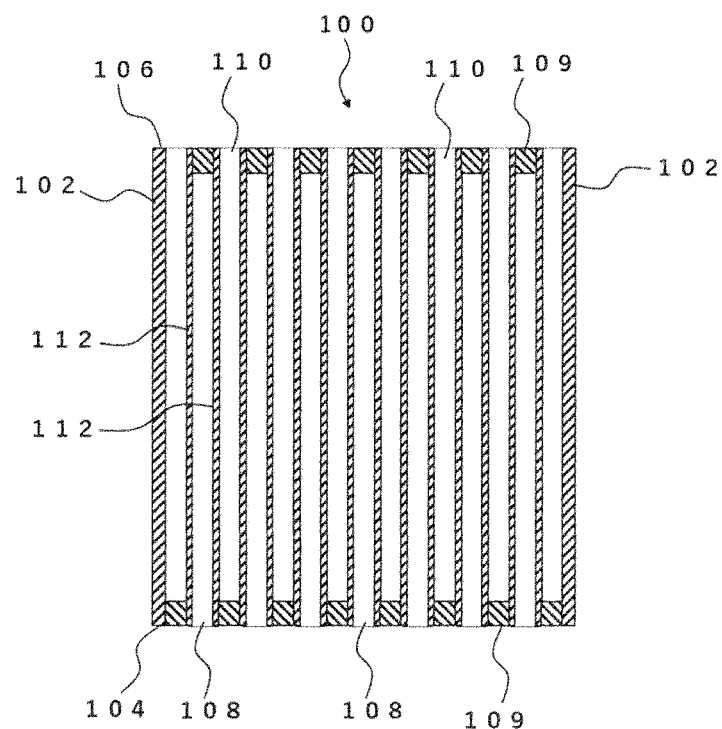
FIG. 2 is a schematic cross-sectional view of a wall flow type pillar-shaped honeycomb structure when observed from a cross-section parallel to the direction in which the cells extend.

FIGS. 1 and 2 illustrate a schematic perspective view and a cross-sectional view of a pillar-shaped honeycomb structure (100) that can be used as a wall flow type exhaust gas filter and/or catalyst carrier for automobiles, respectively. The pillar-shaped honeycomb structure (100) comprises an outer peripheral side wall (102), a plurality of first cells (108) provided on an inner peripheral side of the outer peripheral side wall (102), the first cells (108) extending from a first end surface (104) to a second end surface (106), opening on the first end surface (104) and having a sealing portion on the second end surface (106), and a plurality of second cells (110) provided on the inner peripheral side of the outer peripheral side wall (102), the second cells (110) extending from the first end surface (104) to the second end surface (106), having a sealing portion on the first end surface (104) and opening on the second end surface (106). In this pillar-shaped honeycomb structure (100), the first cells (108) and the second cells (110) are alternately arranged adjacent to each other with a partition wall (112) interposed therebetween.

When the exhaust gas containing particulate matters such as soot is supplied to the first end surface (104) which is on the upstream side of the pillar-shaped honeycomb structure filter (100), the exhaust gas is introduced into the first cells (108) and proceeds downstream in the first cells (108). Since the first cells (108) have sealing portions (109) on the second end surface (106) which is on the downstream side, the exhaust gas permeates the porous partition walls (112) partitioning the first cells (108) and the second cells (110) and flows into the second cells (110). Since the particulate matters cannot permeate the partition walls (112), it is collected and deposited in the first cells (108). After the particulate matters are removed, the clean exhaust gas that has flowed into the second cells (110) proceeds downstream in the second cells (110) and flows out of the second end surface (106) which is on the downstream side.

In one embodiment, an average void ratio of the sealing portions is 4% or less, preferably 3% or less, more preferably 2% or less, and for example, 2 to 4%, on both the first end surface and the second end surface. By setting the average void ratio to 4% or less, it is possible to suppress defects such as peeling of the sealing portions during canning and prevent the erosion.

In the present specification, the average void ratio of the sealing portions is measured by the following procedure. First, the sealing portion for which the void ratio is to be measured is cut in half with a cut surface parallel to the height direction (direction in which the cells extend) of the pillar-shaped honeycomb structure to cut out a cross-section of the sealing portion. Either cross-section obtained of the sealing portion is entirely photographed with a laser microscope (for example, a shape analysis laser microscope VK X250/260 available from KEYENCE CORPORATION) to generate a cross-sectional image of the sealing portion. From the obtained cross-sectional image, only the sealing portion is selected and analyzed with the image processing software attached to the laser microscope, and an area A occupied by the void at a depth of 230 μm is obtained by using the cross-section as a horizontal reference plane. The depth is set to 230 μm in order to avoid recognizing fine pores as voids. Further, the cross-sectional area B of the sealing portion is calculated by: the cross-sectional area B of the sealing portion=cell pitch×the depth of the sealing portion. The cell pitch refers to the distance between a pair of partition walls that partitions the cell in which the sealing portion for which the void ratio is measured is formed in the cross-sectional image. The depth of the sealing portion refers to the length of the sealing portion for which the void ratio is measured in the cross-sectional image in the cell extending direction. Specifically, it refers to the length in the direction in which the cells extend from the end of the cell in which the sealing portion for which the void ratio is measured is formed to the deepest location where the sealing portion exists. The void ratio of the sealing portion is represented by: void ratio (%)=A/B×100(%). The void ratio of the sealing portion is measured at 10 arbitrary locations on each end surface, and the average value is defined as the average void ratio on each end surface.

In one embodiment, the average depth of the sealing portions is 3 to 7 mm, on both the first end surface and the second end surface. When the average depth of the sealing portion is 3 mm or more, the strength of the sealing portion can be ensured. The average depth of the sealing portion is preferably 4.2 mm or more. Further, when the average depth of the sealing portion is 7 mm or less, it is possible to prevent the area of the partition wall that collects the particulate matters in the cell from becoming small. The average depth of the sealing portion is preferably 6 mm or less. The depth of the sealing portion is measured at 20 arbitrary locations on each end surface, and the average value is defined as the average depth of the sealing portions on each end surface.

In one embodiment, the average porosity of the sealing portions is 65% to 75%, on both the first end surface and the second end surface. When the average porosity of the sealing portion to 65% or more, it is advantageous for suppressing defects such as peeling of the sealing portions during canning. The average porosity of the sealing portion is preferably 70% or more. Further, it is advantageous to set the average porosity of the sealing portion to 75% or less in order to prevent the erosion. Therefore, by controlling the average porosity of the sealing portions in combination with the above-mentioned average void ratio of the sealing portions within predetermined ranges, the defect suppressing effect at the time of canning and the erosion suppressing effect become more prominent.

For the porosity of the sealing portion, since it is difficult to sample only the sealing portion and measure it directly, it can be measured by the following procedure by a mercury intrusion method specified in JIS 1655: 2003.

A test piece of a partition wall where a sealing portion is not formed is sampled, and the porosity $P_1$ (porosity of the partition wall) of the test piece is measured.

A test piece of a partition wall having a sealing portion is sampled, and the porosity P (porosity of the partition wall+the sealing portion) of the test piece is measured.

A volume $V_1$ (including the pores) of the partition wall in the test piece of the partition wall having the sealing portion is measured.

A volume $V_2$ (including the pores) of the sealing portion in the test piece of the partition wall having the sealing portion is measured.

Assuming that the porosity of the sealing portion is $P_2$, then P, $P_1$, $P_2$, $V_1$ and $V_2$ satisfy the relationship of the equation (1).

$$P=P_1 \times V_1/(V_1+V_2)+P_2 \times V_2/(V_1+V_2) \quad (1)$$

Therefore, $P_2$ can be obtained by the equation (2).

$$P_2=P \times (V_1+V_2)/V_2-P_1 \times V_1/V_2 \quad (2)$$

The porosity $P_2$ of the sealing portion is measured at 20 arbitrary locations on each end surface, and the average value is defined as the average porosity of the sealing portions at each end surface.

In addition, in the test piece of the partition wall having the sealing portion, Assuming that the volume ratio of the volume $V_1$ (including the pores) of the partition wall is $v_1$ and the volume ratio of the volume $V_2$ (including the pores) of the sealing portion is $v_2$, then $P_2$ may also be obtained by the equation (3).

$$P_2=P \times (v_1+v_2)/v_2-P_1 \times v_1/v_2 \quad (3)$$

The material constituting the sealing portions is not particularly limited, but ceramics are preferable from the viewpoint of strength and heat resistance. As the ceramics, it is preferably a ceramic material comprising at least one selected from the group consisting of cordierite, mullite, zircon, aluminum titanate, silicon carbide, silicon-silicon carbide composite, silicon nitride, zirconia, spinel, indialite, sapphirine, corundum, and titania. For these ceramics, one type may be contained alone, or two or more types may be contained at the same time. The sealing portion is preferably formed of a material containing 50% by mass or more of these ceramics in total, and more preferably formed of a material containing 80% by mass or more of these ceramics in total. It is even more preferable that the sealing portions have the same material composition as the partition walls because the coefficient of expansion at the time of firing can be the same and the durability is improved.

The end surface shape of the pillar-shaped honeycomb structure filter is not limited, and may be, for example, a circle, an ellipse, a race track shape, an oval shape, or polygonal such as a triangle or a quadrangle, or irregular shapes. The illustrated pillar-shaped honeycomb structure (100) has a circular end surface and is cylindrical as a whole.

The shape of the cells in the cross-section perpendicular to direction in which the cells extend is not limited, but is preferably a quadrangle, a hexagon, an octagon, or a combination thereof. Among these, squares and hexagons are preferred. By making the shape of the cells in this way, it is possible to reduce the pressure loss when a fluid is passed through the pillar-shaped honeycomb structure, and the purification performance becomes excellent.

The cell density (the number of cells per unit cross-sectional area) is not particularly limited, but may be, for example, 6 to 2000 cells/square inch (0.9 to 311 cells/cm$^2$), more preferably 50 to 1000 cells/square inch (7.8 to 155 cells/cm$^2$), particularly preferably 100 to 600 cells/square inch (15.5 to 92.0 cells/cm$^2$). Here, the cell density is calculated by dividing the total number of cells (including the sealed cells) by the area of one end surface of the pillar-shaped honeycomb structures excluding the outer peripheral side wall.

The partition walls may be porous. The average porosity of the partition walls may be appropriately adjusted according to usage, but is preferably 40% or more, more preferably 50% or more, and even more preferably 60% or more, from the viewpoint of suppressing the pressure loss of the fluid. Further, the average porosity of the partition walls is preferably 80% or less, more preferably 75% or less, and even more preferably 70% or less, from the viewpoint of ensuring the strength of the pillar-shaped honeycomb structure filter. The porosity of the partition walls is measured with a mercury intrusion method in accordance with JIS-R1655: 2003. Specifically, 20 test pieces of the partition walls are collected evenly including the central portion and the outer peripheral portion of the pillar-shaped honeycomb structure, the porosity of each is measured, and the average value thereof is defined as the average porosity.

It is desirable to set the average pore diameter of the partition walls in an appropriate range according to usage. For example, when using the pillar-shaped honeycomb structure for filter use, the average pore diameter of the partition walls is preferably 24 μm or less, more preferably 22 μm or less, and even more preferably 20 μm or less. When the average pore diameter of the partition walls is in the above range, the collection efficiency of particulate matters is significantly improved. In addition, the average pore diameter of the partition walls is preferably 5 μm or more, more preferably 10 μm or more, and even more preferably 15 μm or more. When the average pore diameter of the partition walls is in the above range, it is possible to suppress the pressure loss decrease. The average pore size of the partition walls refers to the value measured with a mercury intrusion method in accordance with JIS-R1655: 2003. Specifically, 20 test pieces of the partition walls are collected evenly including the central portion and the outer peripheral portion of the pillar-shaped honeycomb structure, the average pore diameter of each is measured, and the average value thereof is defined as the average pore diameter of the entire pillar-shaped honeycomb structure.

The thickness of the partition walls is preferably 150 μm or more, more preferably 170 μm or more, and even more preferably 190 μm or more, from the viewpoint of increasing the strength of the pillar-shaped honeycomb structure and the collection efficiency in the case of filter use. Further, the thickness of the partition walls is preferably 260 μm or less, more preferably 240 μm or less, and even more preferably 220 μm or less from the viewpoint of suppressing pressure loss.

The height of the pillar-shaped honeycomb structure (the length from the first end surface to the second end surface) is also not particularly limited, but may be, for example, 40 mm to 300 mm.

The material constituting the partition walls and the outer peripheral side wall is not particularly limited, but ceramics are preferable from the viewpoint of strength and heat resistance. As the ceramics, it is preferably a ceramic material comprising at least one selected from the group consisting of cordierite, mullite, zircon, aluminum titanate, silicon carbide, silicon-silicon carbide composite, silicon nitride, zirconia, spinel, indialite, sapphirine, corundum, and titania. For these ceramics, one type may be contained alone, or two or more types may be contained at the same time. The partition walls and the outer peripheral side wall are preferably formed of a material containing 50% by mass or more of these ceramics in total, and more preferably formed of a material comprising 80% by mass or more of these ceramics in total.

When the pillar-shaped honeycomb structure is used as a catalyst carrier, the surface of the partition walls can be coated with a catalyst according to the purpose. Examples of the catalyst include, but are not limited to, an oxidation catalyst (DOC) for oxidative combustion of hydrocarbons (HC) and carbon monoxide (CO) to raise the exhaust gas temperature, a PM combustion catalyst that assists the combustion of PM such as soot, a SCR catalyst and a NSR catalyst for removing nitrogen oxides (NOx), and a three-way catalyst that can remove hydrocarbon (HC), carbon monoxide (CO) and nitrogen oxides (NOx) at the same time. The catalyst can appropriately contain, for example, noble metals (Pt, Pd, Rh, and the like), alkali metals (Li, Na, K, Cs, and the like), alkaline earth metals (Mg, Ca, Ba, Sr, and the like), rare earths (Ce, Sm, Gd, Nd, Y, La, Pr, and the like), transition metals (Mn, Fe, Co, Ni, Cu, Zn, Sc, Ti, Zr, V, Cr, and the like).

(2. Manufacturing Method)

A pillar-shaped honeycomb structure having the sealing portions can be manufactured by a known manufacturing method except for the method of forming the sealing portions, but a method will be exemplified as below. First, a green body is formed by kneading a raw material composition comprising a ceramic raw material, a dispersion medium, a pore-former, and a binder. Next, the green body is extruded to form a pillar-shaped honeycomb structure as desired. Additives such as a dispersant can be added to the raw material composition as needed. For extrusion, a die having a desired overall shape, cell shape, partition wall thickness, cell density and the like can be used.

The ceramic raw material is a raw material such as a metal oxide and a metal that remains after firing for constituting the skeleton of the honeycomb fired body as ceramic. The ceramic raw material can be provided, for example, in the form of powder. Examples of the ceramic raw material include a raw material for obtaining ceramics such as cordierite, mullite, zircon, aluminum titanate, silicon carbide, silicon-silicon carbide composite, silicon nitride, zirconia, spinel, indialite, sapphirine, corundum, titania, and the like. Specific examples thereof include, but are not limited to, silica, talc, alumina, kaolin, serpentine, pyrophyllite, brucite, boehmite, mullite, magnesite, and aluminum hydroxide. As the ceramic raw material, one type may be used alone, or two or more types may be used in combination.

In the case of filter applications such as DPF and GPF, cordierite can be preferably used as the ceramic. In this case, a cordierite-forming raw material can be used as the ceramic raw material. The cordierite-forming raw material is a raw material that becomes cordierite by firing. It is desirable that the cordierite-forming raw material have a chemical composition of alumina ($Al_2O_3$) (including the amount of aluminum hydroxide that converts to alumina): 30 to 45% by mass, magnesia (MgO): 11 to 17% by mass, and silica ($SiO_2$): 42 to 57% by mass.

The pore-former is not particularly limited as long as it becomes pores after firing, and examples thereof include, wheat flour, starch, foamed resin, water-absorbing resin, silica gel, carbon (for example, graphite), ceramic balloon, polyethylene, polystyrene, polypropylene, nylon, polyester, acrylic resin, phenol, and the like. As the pore-former, one type may be used alone, or two or more types may be used in combination. From the viewpoint of increasing the porosity of the pillar-shaped honeycomb structure after firing, the amount of the pore-former is preferably 0.5 parts by mass or more, more preferably 2 parts by mass or more, and even more preferably 3 parts by mass or more with respect to 100 parts by mass of the ceramic raw material. From the viewpoint of ensuring the strength of the pillar-shaped honeycomb structure after firing, the amount of the pore-former is preferably 10 parts by mass or less, more preferably 7 parts by mass or less, and even more preferably 4 parts by mass or less with respect to 100 parts by mass of the ceramic raw material.

Examples of the binder include organic binders such as methyl cellulose, hydroxypropoxyl methyl cellulose, hydroxypropyl methyl cellulose, hydroxyethyl cellulose, carboxymethyl cellulose, and polyvinyl alcohol. Further, from the viewpoint of increasing the strength of the pillar-shaped honeycomb structure before firing, the amount of the binder is preferably 4 parts by mass or more, more preferably 5 parts by mass or more, and even more preferably 6 parts by mass or more with respect to 100 parts by mass of the ceramic raw material. From the viewpoint of suppressing the occurrence of crack due to abnormal heat generation in the firing process, the amount of the binder is preferably 9 parts by mass or less, more preferably 8 parts by mass or less, and even more preferably 7 parts by mass or less with respect to 100 parts by mass of the ceramic raw material. As the binder, one type may be used alone, or two or more types may be used in combination.

As the dispersant, ethylene glycol, dextrin, fatty acid soap, polyether polyol and the like can be used. As the dispersant, one type may be used alone, or two or more types may be used in combination. The content of the dispersant is preferably 0 to 2 parts by mass with respect to 100 parts by mass of the ceramic raw material.

Examples of the dispersion medium include water or a mixed solvent of water and an organic solvent such as alcohol, and water can be particularly preferably used.

The water content of the pillar-shaped honeycomb structure before the drying process is carried out is preferably 20 to 90 parts by mass, more preferably 60 to 85 parts by mass, and even more preferably 70 to 80 parts by mass with respect to 100 parts by mass of the ceramic raw material. When the water content of the pillar-shaped honeycomb structure is 20 parts by mass or more with respect to 100 parts by mass of the ceramic raw material, it is easy to obtain the advantage that the quality of the pillar-shaped honeycomb structure is readily stabilized. When the water content of the pillar-shaped honeycomb structure is 90 parts by mass or less with respect to 100 parts by mass of the ceramic raw material, the amount of shrinkage during drying can be reduced and deformation can be suppressed. In the present specification, the water content of the pillar-shaped honeycomb structure refers to a value measured by loss on drying test.

For the drying of the pillar-shaped honeycomb structure, conventionally known drying methods such as hot gas drying, microwave drying, dielectric drying, decompression drying, vacuum drying, and freeze drying can be used. Among these, a drying method that combines hot gas drying with microwave drying or dielectric drying is preferable in that the entire pillar-shaped honeycomb structure can be dried quickly and uniformly.

After the pillar-shaped honeycomb structure is dried, the sealing portions are formed on both end surfaces of the pillar-shaped honeycomb structure. Each of the sealing portions can be formed by a method of filling an opening of the first cells and the second cells where a sealing portion is to be formed with a slurry, and then drying and firing the filled slurry. In one embodiment, the slurry for forming the sealing portions contains 0.1 to 0.5 parts by mass of a thickener, 0.2 to 1.0 parts by mass of a binder, 7 to 15 parts by mass of a pore-former, and 30 to 50 parts by mass of water, with respect to 100 parts by mass of the ceramic raw material.

The slurry for forming the sealing portions with the above composition has a smaller proportion of the pore-former than conventional slurries. The porosity of the sealing portion can be suppressed by reducing the blending ratio of the pore-former. However, simply reducing the blending ratio of the pore-former tends to generate large voids in the sealing portions, and the effect of preventing erosion cannot be expected so much. By additionally reducing the blending ratio of the thickener as compared with the conventional ones, the void ratio of the obtained sealing portions becomes small, which is preferable. As a result, the occurrence of defects during canning is suppressed, and the effect of preventing the erosion can be obtained. Therefore, the thickener in the slurry for forming the sealing portions is preferably 0.5 parts by mass or less, and more preferably 0.4 parts by mass or less with respect to 100 parts by mass of the ceramic raw material. However, if the content of the thickener is too small, the fluidity of the slurry for forming the sealing portions is lowered, and it becomes difficult to fill the slurry for forming the sealing portions into the openings of the first cells and the second cells where sealing portions are to be formed. Therefore, the thickener in the slurry for forming the sealing portions is preferably 0.1 part by mass or more, and more preferably 0.2 part by mass or more with respect to 100 parts by mass of the ceramic raw material.

Therefore, in a preferred embodiment, the slurry for forming the sealing portions contains 0.2 to 0.4 parts by mass of a thickener, 0.2 to 0.5 parts by mass of a binder, 7 to 15 parts by mass of a pore-former, and 35 to 40 parts by mass of water, with respect to 100 parts by mass of the ceramic raw material. The slurry for forming the sealing portions having the above composition can make the void ratio of the sealing portions more preferable, and the occurrence of defects during canning and the erosion can be suppressed more effectively.

In one embodiment, a viscosity of the slurry for forming the sealing portions measured at a shear rate of $1.04\ \text{sec}^{-1}$ at 25° C. by a viscosity measuring method in accordance with JIS R1652: 2003 using a Brookfield type single rotational B type viscometer is 250 to 350 dPa·s, preferably 270 to 320 dPa·s. By setting the viscosity of the slurry for forming the sealing portions within these ranges, it becomes easy to fill the openings of the cells with the slurry for forming the sealing portions at a desired depth.

Examples of a ceramic raw material used for the slurry for forming the sealing portions include, for example, a raw material for obtaining ceramics such as cordierite, mullite, zircon, aluminum titanate, silicon carbide, silicon-silicon carbide composite, silicon nitride, zirconia, spinel, indialite, sapphirine, corundum, titania, and the like. Specific examples thereof include, but are not limited to, silica, talc, alumina, kaolin, serpentine, pyrophyllite, brucite, boehmite, mullite, magnesite, and aluminum hydroxide. As the ceramic raw material, one type may be used alone, or two or more types may be used in combination.

Examples of the thickener used in the slurry for forming the sealing portions include pectin, guar gum, xanthan gum, propylene glycol, and polyethylene oxide. Among these, polyethylene oxide, which shows a high viscosity even at a low concentration and has a fluidity modifying effect, is preferable. As the thickener, one type may be used alone, or two or more types may be used in combination.

Examples of the binder include organic binders such as methyl cellulose, hydroxypropoxyl methyl cellulose, hydroxypropyl methyl cellulose, hydroxyethyl cellulose, hydroxyethyl methyl cellulose, carboxymethyl cellulose, and polyvinyl alcohol. As the binder, one type may be used alone, or two or more types may be used in combination.

The pore-former is not particularly limited as long as it becomes pores after firing, and examples thereof include, wheat flour, starch, foamed resin, water-absorbing resin, silica gel, carbon (for example, graphite), ceramic balloon, polyethylene, polystyrene, polypropylene, nylon, polyester, acrylic resin, phenol, and the like. As the pore-former, one type may be used alone, or two or more types may be used in combination.

The slurry for forming the sealing portions may appropriately contain a dispersant. The dispersant can be contained, for example, 5 to 15 parts by mass, preferably 8 to 12 parts by mass with respect to 100 parts by mass of the ceramic raw material. Examples of the dispersant include ethylene glycol, dextrin, fatty acid soap, polyether polyol and the like. As the dispersant, one type may be used alone, or two or more types may be used in combination.

As the water, generally known purified water, ion-exchanged water, or the like can be used.

Figure 3:
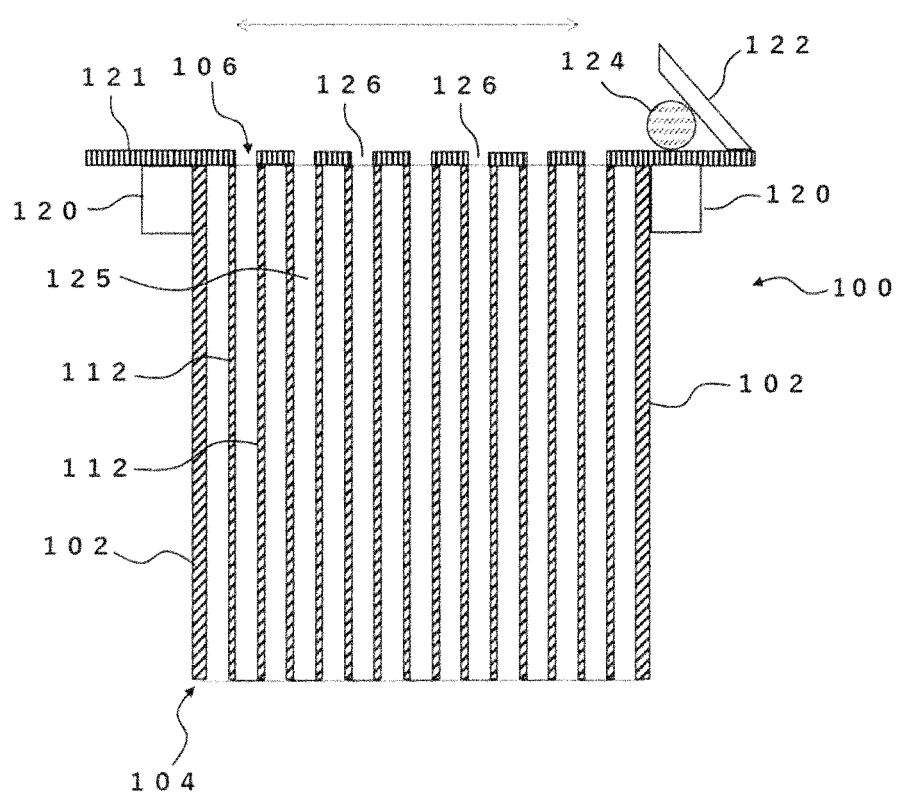
FIG. 3 is an explanatory view schematically showing an example of a method for forming sealing portions by a squeegee technique.

Filling of the slurry for forming the sealing portions into the openings of the cells can be carried out by, for example, the following "squeegee technique". As shown in FIG. 3, a film (121) is attached to the upper end surface (here, the second end surface (106) in the drawing) of a pillar-shaped honeycomb structure (100) after drying which is fixed by using a chuck (120), and the film (121) is irradiated with a laser at positions corresponding to the arrangement condition (for example, "checkered pattern") of the sealing portions, and a plurality of holes (126) are formed in the film (121).

After that, a slurry (124) for forming the sealing portions is placed on the film (121), and the squeegee (122) is moved along the film (121) in the direction of the arrow in FIG. 3. As a result, the cells (125) opening at the positions corresponding to the holes (126) of the film (121) is filled with a certain amount of the slurry (124) for forming the sealing portions.

The depth of the sealing portions can be changed by the number of movement operations of the squeegee (122), the contact angle between the squeegee (122) and the film (121), the pressing pressure of the squeegee (122) against the film (121), the viscosity of the slurry (124) for forming the sealing portions, and the like.

After filling the slurry (124) for forming the sealing portions, the film (121) is peeled off and the entire pillar-shaped honeycomb structure (100) is dried. As a result, the slurry (124) for forming the sealing portions filled in the cells (125) is dried, and the sealing portions before firing are formed. Drying can be carried out, for example, under conditions of a drying temperature of 100 to 230° C. for about 60 to 100 seconds. After drying, the sealing portions protrude from the end surface of the pillar-shaped honeycomb structure by the thickness of the film, so that it can be scraped off if necessary.

The material of the film is not particularly limited, but is preferably polypropylene (PP), polyethylene terephthalate (PET), polyimide, or Teflon (registered trademark) because of easy thermal processing to form holes. Further, the film preferably has an adhesive layer, and the material of the adhesive layer is preferably an acrylic resin, a rubber (for example, a rubber containing a natural or synthetic rubber as a main component), or a silicon-based resin. As the film, for example, an adhesive film having a thickness of 20 to 50 μm can be preferably used.

In addition to the above-mentioned "squeegee technique", an "intrusion technique" can be mentioned as a method for filling the slurry for forming the sealing portions into the openings of the cells. In the "intrusion technique", the end surface portion of the pillar-shaped honeycomb structure with an attached film having perforated holes is immersed in a liquid tank containing a slurry for forming the sealing portions, so that the slurry for forming the sealing portions is filled into the cells. In this case, the depth of the sealing portions can be altered by the depth where the pillar-shaped honeycomb structure is immersed in the slurry for forming the sealing portions.

After that, the pillar-shaped honeycomb structure is usually provided as a fired body by performing degreasing and firing. The combustion temperature of the binder is about 200° C., and the combustion temperature of the pore-former is about 300 to 1000° C. Therefore, the degreasing process may be carried out by heating the honeycomb formed body in the range of about 200 to 1000° C. The heating time is not particularly limited, but is usually about 10 to 100 hours. The honeycomb formed body after the degreasing process is called a calcined body. The firing process depends on the material composition of the pillar-shaped honeycomb structure, but can be performed, for example, by heating the calcined body to 1350 to 1600° C. and keeping the temperature for 3 to 10 hours.

EXAMPLES

Hereinafter, examples for better understanding the present invention and its advantages will be described, but the present invention is not limited to the examples.

(1) Manufacture of Pillar-Shaped Honeycomb Structure

To 100 parts by mass of the cordierite-forming raw material, 3.5 parts by mass of pore-former, 65 parts by mass of dispersion medium, 6 parts by mass of organic binder, and 1.0 part by mass of dispersant were added, mixed and kneaded to prepare a green body. Alumina, aluminum hydroxide, kaolin, talc, and silica were used as the cordierite-forming raw material. Water was used as the dispersion medium. Examples of the pore-former include organic pore-formers such as carbon such as graphite, wheat flour, starch, phenol resin, acrylic resin (e.g., polymethyl methacrylate), polyethylene and polyethylene terephthalate. Examples of the organic binder include hydroxypropylmethyl cellulose, methyl cellulose, hydroxyethyl cellulose, carboxymethyl cellulose, polyvinyl alcohol and the like. As the dispersant, for example, ethylene glycol, dextrin, fatty acid soap, polyalcohol, potassium laurate soap and the like could be suitably used.

This green body was charged into an extrusion molding machine and extruded through a die having a predetermined shape to obtain a pillar-shaped honeycomb structure having a cylindrical shape. The obtained pillar-shaped honeycomb structure was subject to dielectric drying and hot air drying, and then both end surfaces were cut so as to have predetermined dimensions, and further dried under the condition of 120° C.×1 hour.

The specifications of the pillar-shaped honeycomb structure after drying were as follows.

Overall shape: cylindrical with a diameter of 117 mm and a height of 122 mm

Cell shape in a cross-section perpendicular to the cell flow path direction: square Cell density (number of cells per unit cross-section area): 300 cells/square inch Partition wall thickness: 203 μm (nominal value based on the die specifications)

(2) Preparation of Slurry for the Sealing Portions

Slurries for forming the sealing portions of each of Examples and Comparative Examples having the compositions shown in Table 1 were prepared. As the binder, methyl cellulose and hydroxyethyl methyl cellulose were used. Polyethylene oxide was used as the thickener. Polyalcohol was used as the dispersant. Acrylic resin was used as the pore-former.

For each slurry for forming the sealing portions, the viscosity was measured at a shear rate of 1.04 sec$^{-1}$ at 25° C. according to a viscosity measuring method of JIS R1652: 2003 using a Brookfield type single rotational B type viscometer (model VT-06 available from Rion). The results are shown in Table 1.

(3) Formation of Sealing Portions

Using the "squeegee technique" described above, both end surfaces were filled with the slurry for forming the sealing portions so that the first cells and the second cells were alternately arranged adjacent to each other. Then, it was dried in an air atmosphere under the condition of 100 to 230° C.×100 seconds or less. Next, it was degreased by heating at about 200° C. in an air atmosphere, and further fired in an air atmosphere at a temperature of 1410 to 1450° C. for 3 to 10 hours to obtain a pillar-shaped honeycomb structure with the sealing portions.

(4) Characteristics of Sealing Portions

For each pillar-shaped honeycomb structure after firing, the average depth and the average void ratio of the sealing portions were measured using a shape analysis laser microscope VK X250/260 available from KEYENCE CORPORATION according to the procedure described above. Further, for each pillar-shaped honeycomb structure after firing, the average porosity of the sealing portions was measured by the method described above using a porosimeter (model Auto Pole IV available from Micromeritics). The results are shown in Table 1.

(5) Erosion Characteristics

The erosion characteristics were evaluated by the following procedure. Each of the obtained pillar-shaped honeycomb structures after firing was canned (accommodated) in a can body, and the canned pillar-shaped honeycomb structure was placed in a gas burner tester. Next, abrasive grains made of SiC were made to collide with one end surface of the pillar-shaped honeycomb structure by the gas burner tester. The conditions for colliding the abrasive grains were as follows.

Injected amount of abrasive grain: 30 g
Temperature of gas flowing into the pillar-shaped honeycomb structure: 700° C.
Flow rate of gas flowing into the pillar-shaped honeycomb structure: 10 Nm$^3$/min
The test time was 30 minutes, during which the abrasive grains were injected little by little.

For the amount of erosion, the erosion depth of the sealing portion of all cells on the end surface where the abrasive grains were collided was measured using an industrial CT, and the average value was taken as the amount of erosion. The measured erosion depth of the sealing portion of each cell was defined as the maximum depth (the distance from the end surface in the direction in which the cells extend) where the sealing portion was actually scraped by the abrasive grains in the cross-sectional view by the CT observation. The results are shown in Table 1. In Comparative Example 1, the amount of erosion was 2.5 mm, whereas in Comparative Example 2, it was observed that the sealing portions were completely penetrated. On the other hand, in Comparative Example 3, the amount of erosion was 2.5 mm. In Example 1, Example 2, and Example 3, it was confirmed that the amount of erosion was suppressed to 1.0 mm.

(6) Canning Characteristics

A canning simulation test was carried out by a winding test. A mat was wound around the outer peripheral side wall of each pillar-shaped honeycomb structure, and a metal plate (SUS304) having a thickness of about 1 mm was wound on the mat. In this state, the pillar-shaped honeycomb structure was installed in a winding tester, and a wire was wound around the outer circumference of the metal plate, and the wire was gradually tightened while increasing the pressure to confirm whether or not the sealing portions were peeled off. It was confirmed that in all of Comparative Example 1, Comparative Example 2, Comparative Example 3, Example 1, Example 2, and Example 3, peeling of the sealing portions did not occur at a pressure of up to 1.1 MPa.

(7) Discussion

As can be seen from the above test results, Comparative Example 1 did not have a sufficient effect of preventing erosion. In Comparative Example 2 as compared with Comparative Example 1, the average porosity of the sealing portions was lowered by reducing the content of the pore-former in the slurry for forming the sealing portions. However, on the contrary, the average void ratio became large, and the characteristics for erosion did not improve. When the cross-section of the sealing portions of Comparative Example 1 was observed, many voids were observed inside.

On the other hand, in Comparative Example 3, the content of the thickener in the slurry for forming the sealing portions was further reduced as compared with Comparative Example 2. As a result, the average void ratio in the sealing portions was significantly reduced, and the effect of preventing erosion was improved. In addition, no defects such as peeling of the sealing portions during canning were observed. However, in Comparative Example 3, sink marks were confirmed at the inner end of the sealing portions.

In Examples 1, 2 and 3, the content of the thickener in the slurry for forming the sealing portions was further reduced as compared with Comparative Example 3. As a result, the average void ratio in the sealing portions was further reduced, and no sink marks were observed. Therefore, the effect of preventing erosion was further improved. In addition, no defects such as peeling of the sealings during canning were observed.

TABLE 1

| Test No. | | | Comparative Example 1 | Comparative Example 2 | Comparative Example 3 | Example 1 | Example 2 | Example 3 |
|---|---|---|---|---|---|---|---|---|
| Slurry composition (parts by mass) | Ceramics raw material | Talc | 40 | 40 | 40 | 40 | 40 | 40 |
| | | Alumina | 15 | 15 | 15 | 15 | 15 | 15 |
| | | Aluminum hydroxide | 10 | 10 | 10 | 10 | 10 | 10 |
| | | Kaolin | 25 | 30 | 30 | 30 | 30 | 30 |
| | | Crystalline silica | 10 | 5 | 5 | 5 | 5 | 5 |
| | | Total | 100 | 100 | 100 | 100 | 100 | 100 |
| | Auxiliary raw material | Binder | 0.45 | 0.45 | 0.45 | 0.45 | 0.45 | 0.45 |
| | | Thickener | 1.00 | 1.00 | 0.70 | 0.40 | 0.30 | 0.20 |
| | | Polyalcohol | 10 | 10 | 10 | 10 | 10 | 10 |
| | | Pore-forming material | 21 | 12 | 12 | 12 | 12 | 12 |
| | | Water | 44 | 42 | 41 | 38 | 37 | 36 |
| Viscosity (dPa · s) | | | 300 | 300 | 300 | 300 | 300 | 300 |
| Average depth of sealing portion (mm) | | | 5 | 5 | 5 | 5 | 5 | 5 |
| Average void ratio of sealing portion (mm) | | | 6% | 38% | 8% | 4% | 4% | 3% |
| Average porosity of sealing portion | | | 80% | 72% | 72% | 72% | 72% | 72% |
| Amount of erosion (mm) | | | 2.5 | 5.0 | 2.5 | 1.0 | 1.0 | 1.0 |

DESCRIPTION OF REFERENCE NUMERALS

100 Pillar-shaped honeycomb structure
102 Outer peripheral side wall
104 First end surface
106 Second end surface
108 First cell
109 Sealing portion
110 Second cell
112 Partition wall
120 Chuck
121 Film
122 Squeegee
124 Slurry for forming sealing portion
125 Cell
126 Hole

The invention claimed is:

1. A pillar-shaped honeycomb structure comprising an outer peripheral side wall, a plurality of first cells provided on an inner peripheral side of the outer peripheral side wall, the first cells extending from a first end surface to a second end surface, each opening on the first end surface and having a sealing portion with an average void ratio of 2% or more and 4% or less on the second end surface, and a plurality of second cells provided on the inner peripheral side of the outer peripheral side wall, the second cells extending from the first end surface to the second end surface, each having a sealing portion with an average void ratio of 2% or more and 4% or less on the first end surface and opening on the second end surface, the first cells and the second cells being alternately arranged adjacent to each other with a partition wall interposed therebetween.

2. The pillar-shaped honeycomb structure according to claim 1, wherein an average porosity of the sealing portions is 65% to 75% on both the first end surface and the second end surface.

3. A method for manufacturing a pillar-shaped honeycomb structure according to claim 1 comprising an outer peripheral side wall, a plurality of first cells provided on an inner peripheral side of the outer peripheral side wall, the first cells extending from a first end surface to a second end surface, each opening on the first end surface and having a sealing portion on the second end surface, and a plurality of second cells provided on the inner peripheral side of the outer peripheral side wall, the second cells extending from the first end surface to the second end surface, each having a sealing portion on the first end surface and opening on the second end surface, the first cells and the second cells being alternately arranged adjacent to each other with a partition wall interposed therebetween, the method comprising filling an opening portion of the first cells and the second cells where a sealing portion is to be formed with a slurry, and then drying and firing the filled slurry to form each of the sealing portions,
wherein the slurry for forming the sealing portions comprises 0.1 to 0.5 parts by mass of a thickener, 0.2 to 1.0 parts by mass of a binder, 7 to 15 parts by mass of a pore-former, and 30 to 50 parts by mass of water, with respect to 100 parts by mass of a ceramic raw material.

4. The method for manufacturing a pillar-shaped honeycomb structure according to claim 3, wherein the slurry for forming the sealing portions comprises 0.2 to 0.4 parts by mass of the thickener, 0.2 to 0.5 parts by mass of the binder, 7 to 15 parts by mass of the pore-former, and 35 to 40 parts by mass of the water, with respect to 100 parts by mass of the ceramic raw material.

5. The method for manufacturing a pillar-shaped honeycomb structure according to claim 3, wherein a viscosity of the slurry for forming the sealing portions measured at a shear rate of 1.04 sec−1 at 25° C. by a viscosity measuring method in accordance with JIS R1652: 2003 using a Brookfield type single rotational B type viscometer is 250 to 350 dPa·s.

6. The method for manufacturing a pillar-shaped honeycomb structure according to claim 3, wherein the pore-former is a foamed resin.

7. The method for manufacturing a pillar-shaped honeycomb structure according to claim 3, wherein the pore-former is a powder having a D80 of more than 55 μm and a D90 of more than 70 μm in a volume-based cumulative particle size distribution obtained by a laser diffraction/scattering method.

* * * * *